United States Patent [19]

Sone et al.

[11] 4,449,371

[45] May 22, 1984

[54] AIR BY-PASS SYSTEM IN AN INTERNAL COMBUSTION ENGINE WITH A SUPERCHARGER

[75] Inventors: Shigeru Sone, Toyota; Yasuhiro Ikuta, Okazaki; Kazuaki Komiya, Toyota; Kazuhide Kihira, Toyota; Nobutaka Mizuno, Toyota, all of Japan

[73] Assignee: Toyota Jidosha Kogyo Kabushiki Kaisha, Aichi, Japan

[21] Appl. No.: 180,421

[22] Filed: Aug. 22, 1980

[30] Foreign Application Priority Data

Jul. 1, 1980 [JP] Japan ................................. 55/88470

[51] Int. Cl.³ ............................................. F02B 37/00
[52] U.S. Cl. .................................................. 60/611
[58] Field of Search ........................ 60/600, 601, 611; 123/564

[56] References Cited

U.S. PATENT DOCUMENTS 3,049,865  8/1962  Drayer ................................. 60/611
3,651,636  3/1972  Glassey et al. ...................... 60/611

FOREIGN PATENT DOCUMENTS 1451898  7/1969  Fed. Rep. of Germany ........ 60/611
2416287  10/1975  Fed. Rep. of Germany ........ 60/611

Primary Examiner—Michael Koczo
Attorney, Agent, or Firm—Parkhurst & Oliff

[57] ABSTRACT

An air by-pass system in an internal combustion engine with a turbocharger which comprises a compressor driven by an exhaust gas turbine for supercharging suction air fed to the engine through a throttle valve, wherein an air by-pass passage is provided for connecting an area upstream from the compressor and an area downstream from the throttle valve, and an air valve is provided in the by-pass passage for controlling the amount of the by-pass air.

1 Claim, 3 Drawing Figures

AIR BY-PASS SYSTEM IN AN INTERNAL COMBUSTION ENGINE WITH A SUPERCHARGER

This invention relates to an air by-pass system in an internal combustion engine with a supercharger and, in particular, with a turbocharger.

In a conventional known internal combustion engine with a turbocharger, an air by-pass passage is provided which connects the areas upstream and the downstream from a throttle valve. Suction air is fed to the engine through the by-pass passage even when the engine temperature is not high enough to fully operate the turbocharger, in order to cause the engine to start easily even in low temperature and to be quickly warmed. In this regard, the amount of fuel which is ejected from a fuel injection valve (or valves) varies in proportion to the amount of the suction air which is measured by an air flow meter. Accordingly, the amount of the fuel can be increased by increasing the amount of the suction air when the engine is started in low temperature, so that the engine will easily start even in low temperature and will be quickly warmed. The amount of the by-pass air can be controlled by an air valve arranged in the by-pass passage.

The air valve usually includes a bimetallic element which is actuated by a heat coil to open and close a valve plate secured to the bimetallic element. The air valve ensures the feed of a desired amount of by-pass air in accordance with the warming condition of the engine.

However, in the prior art air by-pass system mentioned above, since the air by-pass passage is connected to an area downstream from a compressor of the turbocharger, if a lubricant oil of the turbocharger leaks from the turbocharger for any reason, for example, a failure of the oil seal, the leaked oil can enter the air by-pass passage. Such oil can adhere to the air valve in the by-pass passage, resulting in the breakage of the heat coil or another component of the air valve. In addition, oil adhered to the valve plate becomes hard when the temperature of the engine is low, so that the valve plate cannot be completely closed due to the existence of the oil mass.

The object of the present invention is to eliminate the above mentioned disadvantages by providing an improved air by-pass system in which the air by-pass passage connects an area on the upstream side of the compressor of the turbocharger and an area on the downstream side of the throttle valve, so that air which does not include oil can always be introduced into the by-pass passage.

The invention will be discussed below, with reference to the accompanying drawings in which.

Figure 1:
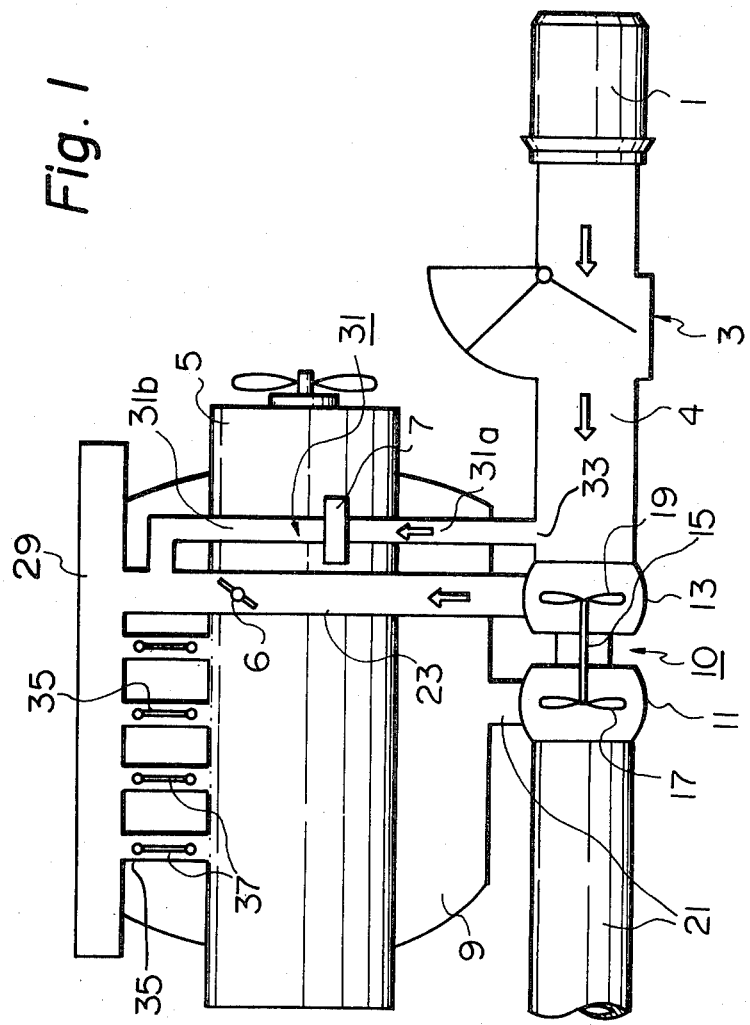
FIG. 1 is a view schematically illustrating an air by-pass system according to the present invention.

Referring to FIG. 1, a turbocharger 10, known per se, includes an exhaust gas turbine 11 which has a turbine wheel 17 operated by the exhaust gas, and a compressor 13 which has an impeller 19 connected to the turbine 11 by means of a rotor shaft 15. The turbine 11 is arranged in an exhaust pipe 21 and is operated, i.e. rotated, by the exhaust gas under high temperature and high pressure from an exhaust manifold 9. The rotation of the turbine 11 is transmitted to the compressor 13 by means of the rotor shaft 15, so that the compressor 13, which is arranged in an intake pipe 4, supercharges the suction air to an engine 5.

The amount of the suction air from an air cleaner 1 is measured by an air flow meter 3 in the intake pipe 4 and the air flow meter 3 feeds a signal corresponding to the measurement to fuel injection valves 37 arranged in an intake manifold 35. As a result, the amount of the fuel ejected from the fuel injection valves 37 can be controlled in accordance with the amount of the suction air.

A throttle valve 6 is arranged in a suction air connecting pipe 23, which connects a surge tank 29 and the compressor 13.

When the engine is started in high temperature, such as when the engine is restarted soon after it has been warmed up and stopped, since the engine friction is small, the engine will easily start even when the throttle valve 6 is in its idle position, that is, even when the amount of the suction air controlled by an idle adjust screw (not shown) provided on the throttle valve portion is small. However, in low temperature, since the engine friction is large, the amount of the suction air controlled by the idle adjust screw is not sufficient to start the engine. In order to make it possible to start the engine even in low temperature, an air by-pass passage 31 is provided.

According to the present invention, an inlet port 33 of the by-pass passage 31 is connected to the upstream portion of the intake pipe 4 from the compressor 13, unlike the prior art in which the inlet port has been connected to the downstream side of the compressor. That is, according to the present invention, the by-pass passage 31 connects an area upstream from the compressor 13 and an area downstream from the throttle valve 6.

Figure 2:
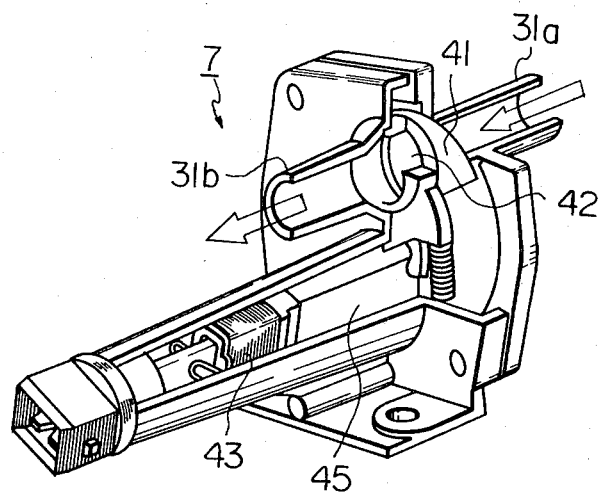
FIGS. 2 and 3 are partially exploded perspective views of one example of an air valve, at its open and closed positions, respectively.
Figure 3:
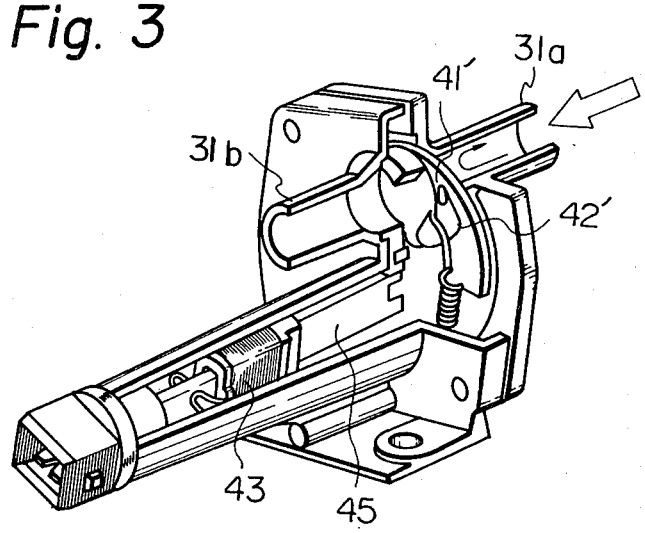

In the by-pass passage 31 is arranged an air valve 7, which is known per se, to control the amount of the by-pass air. One example of the air valve 7 is illustrated in FIGS. 2 and 3. In FIG. 2, which illustrates the state before the engine warms up (low temperature of the engine), a valve port 42 of a valve plate 41 communicates a by-pass passage portion 31a (upstream side) with another by-pass passage portion 31b (downstream side) so that, referring to FIG. 1, suction air from the air cleaner 1 can be fed to the surge tank 29 and the engine 5 through the by-pass passage 31. As a result, the amount of suction air can be increased even when the throttle valve 6 is in its idle position.

Referring again to FIG. 2, as soon as an ignition switch (not shown) is turned on, electric current is fed to a heat coil 43 which is electrically connected to the ignition switch, so that a bimetallic element 45 is heated. Consequently, the bimetallic element deforms due to the heat and rotates the valve plate 41 connected to the bimetallic element in the clockwise direction in FIG. 2. The valve plate 41 is finally brought into a closed position 41' (FIG. 3). When the valve plate 41 moves to the position 41', the valve port 42 of the valve plate moves to a position 42' (FIG. 3), in which the valve port 42 is off set from the passage 31 and the air valve 7 is closed. Thus, the air valve 7 can be closed after warming up of the engine.

As can be understood from the above discussion, according to the present invention, since the by-pass passage 31 is diverged from the intake pipe at the upstream side of the compressor 13 of the turbocharger 10, even if lubricant leaks from the turbocharger, it is prevented from flowing into the by-pass passage 31, and accordingly, into the air valve 7. Thus, only suction air which contains no lubricant oil from the turbocharger is fed into the by-pass passage 31.

We claim:

1. In an internal combustion engine with a turbocharger comprising an exhaust gas driven turbine in an exhaust pipe of the engine and a compressor in an intake pipe of the engine, said compressor being driven by the turbine to turbocharge suction air fed to the engine through a throttle valve in an air connecting pipe connecting the compressor to the engine, an air by-pass system comprising a suction air by-pass passage fluidly connecting an area upstream from and in fluid communication with the compressor and an area downstream from and in fluid communication with the throttle valve, a temperature controlled air valve for controlling the amount of air to be by-passed through said by-pass passage, and means for actuating the air valve to an open position at the time of engine ignition to by-pass air through said by-pass passage and for actuating said air valve to a closed position after a period of time sufficient to permit the engine to warm-up.

* * * * *